(12) United States Patent
Sandberg et al.

(10) Patent No.: US 10,487,723 B2
(45) Date of Patent: Nov. 26, 2019

(54) CHARGE AIR COOLER ARRANGEMENT

(71) Applicant: WÄRTSILÄ FINLAND OY, Vaasa (FI)

(72) Inventors: Juho Sandberg, Vaasa (FI); Janne Mäki, Vaasa (FI)

(73) Assignee: WÄRTSILÄ FINLAND OY, Vaasa (FI)

( * ) Notice: Subject to any disclaimer, the term of this patent is extended or adjusted under 35 U.S.C. 154(b) by 192 days.

(21) Appl. No.: 15/575,545

(22) PCT Filed: Jun. 10, 2015

(86) PCT No.: PCT/FI2015/050410
§ 371 (c)(1),
(2) Date: Nov. 20, 2017

(87) PCT Pub. No.: WO2016/198727
PCT Pub. Date: Dec. 15, 2016

(65) Prior Publication Data
US 2018/0135509 A1    May 17, 2018

(51) Int. Cl.
*F02B 29/04* (2006.01)
*F02M 35/10* (2006.01)
*F02M 35/16* (2006.01)

(52) U.S. Cl.
CPC ...... *F02B 29/0475* (2013.01); *F02B 29/0462* (2013.01); *F02M 35/1034* (2013.01);
(Continued)

(58) Field of Classification Search
CPC ............ F02B 29/0462; F02B 29/0475; F02M 35/10157; F02M 35/10262;
(Continued)

(56) References Cited

U.S. PATENT DOCUMENTS 1,542,613 A    6/1925  Cox
2,595,822 A *  5/1952  Uggerby ............... F28D 7/1607
                                                    165/159

(Continued)

FOREIGN PATENT DOCUMENTS

DE    197 35 306 A1    2/1999
DE    103 12 788 A1    9/2004
(Continued)

OTHER PUBLICATIONS

International Search Report (PCT/ISA/210) dated Feb. 22, 2016, by the European Patent Office as the International Searching Authority for International Application No. PCT/FI2015/050410.
(Continued)

*Primary Examiner* — Jesse S Bogue
(74) *Attorney, Agent, or Firm* — Buchanan Ingersoll & Rooney PC

(57) ABSTRACT

The charge air cooler arrangement for a piston engine includes an air cooler housing, a charge air cooler, which is arranged inside the air cooler housing, and an air duct that is connected to the air cooler housing for introducing charge air into the charge air cooler. The air duct is configured to protrude into the air cooler housing and to be attached to the charge air cooler.

3 Claims, 3 Drawing Sheets

(52) U.S. Cl.
CPC ............... *F02M 35/10157* (2013.01); *F02M 35/10262* (2013.01); *F02M 35/10268* (2013.01); *F02M 35/165* (2013.01); *Y02T 10/144* (2013.01); *Y02T 10/146* (2013.01)

(58) Field of Classification Search
CPC ......... F02M 35/10268; F02M 35/1034; F02M 35/165; Y02T 10/144; Y02T 10/146
See application file for complete search history.

(56) References Cited

U.S. PATENT DOCUMENTS

| | | | | |
|---|---|---|---|---|
| 3,881,455 | A | * | 5/1975 | Belsanti .............. F02B 29/0462 123/563 |
| 4,191,148 | A | * | 3/1980 | Patel ..................... F01P 3/18 123/563 |
| 4,476,842 | A | * | 10/1984 | Belsanti .............. F02B 29/0462 123/563 |
| 4,564,065 | A | * | 1/1986 | Roberts ................ F28F 9/0219 165/154 |
| 8,316,925 | B2 | | 11/2012 | Pimentel et al. |
| 9,279,395 | B2 | | 3/2016 | Lorenz et al. |
| 9,890,692 | B1 | * | 2/2018 | Turnage ................ F02B 29/045 |
| 2008/0202724 | A1 | | 8/2008 | Lorenz et al. |
| 2009/0014153 | A1 | | 1/2009 | Pimentel et al. |
| 2016/0194990 | A1 | | 7/2016 | Lorenz et al. |

FOREIGN PATENT DOCUMENTS

| | | |
|---|---|---|
| EP | 2 014 892 A1 | 1/2009 |
| JP | H 03-73630 U | 7/1991 |
| JP | 2003-148148 A | 5/2003 |
| JP | 2010101273 A * | 5/2010 |

OTHER PUBLICATIONS

Written Opinion (PCT/ISA/237) dated Feb. 22, 2016, by the European Patent Office as the International Searching Authority for International Application No. PCT/FI2015/050410.

International Preliminary Report on Patentability dated May 9, 2017, by the European Patent Office as the International Preliminary Examining Authority for International Application No. PCT/FI2015/050410.

* cited by examiner ary of claim 1.

CHARGE AIR COOLER ARRANGEMENT

TECHNICAL FIELD OF THE INVENTION

The present invention relates to a charge air cooler arrangement for a piston engine in accordance with the preamble of claim 1.

BACKGROUND OF THE INVENTION

Large piston engines, such as ship and power plant engines, are usually provided with turbochargers for increasing the pressure of the intake air. Because of the high intake air pressures, effective cooling of the intake air is needed to keep the temperature of the intake air after the turbocharger at an acceptable level. The intake air system therefore comprises one or more charge air coolers, which usually utilize cooling water for absorbing heat from the intake air. Commonly, the charge air cooling takes place in two stages. In the first stage, high-temperature cooling water is used for initial cooling of the intake air and in the second stage low-temperature cooling water is used for the final cooling of the intake air.

The charge air coolers are mounted inside air cooler housings. An air duct is connected to an outer side of the air cooler housing for introducing the intake air into the charge air cooler. A seal is needed between the air duct and the air cooler housing. The charge air cooler is connected to the air cooler housing and a seal is arranged in the joint between the charge air cooler and the air cooler housing. The air cooler housing is usually manufactured by casting. However, in order to ensure effective sealing between the air cooler housing and the charge air cooler and between the air cooler housing and the air duct, those surfaces of the air cooler housing that form part of the joints between the air cooler housing and the adjacent components need to be machined. This is a problem especially in the case of the surface against which the charge air cooler is arranged. Since the surface is inside the air cooler housing, machining of the surface is both complicated and slow. Good surface quality and small tolerances are difficult to reach, and therefore the joint between the charge air cooler and the air cooler housing is exposed to air leakages. The need to machine the inner surface of the air cooler housing also increases the manufacturing costs.

SUMMARY OF THE INVENTION

The object of the present invention is to provide an improved charge air cooler arrangement for a piston engine. The arrangement comprises an air cooler housing, a charge air cooler, which is arranged inside the air cooler housing, and an air duct that is connected to the air cooler housing for introducing charge air into the charge air cooler. The characterizing features of the charge air cooler arrangement according to the invention are given in the characterizing part of claim 1.

According to the invention, the air duct is configured to protrude into the air cooler housing and to be attached to the charge air cooler. Because of the air duct that protrudes into the air cooler housing, the charge air cooler does not need to be sealed against the inner surface of the air cooler housing. Demanding machining of the inner surface of the air cooler housing can thus be avoided. This reduces the manufacturing costs of the charge air cooler arrangement and also reduces the risk of air leakages.

According to an embodiment of the invention, the air duct is provided with a protrusion, which protrudes into the air cooler housing. The protrusion can comprise a contact surface, which is arranged against a contact surface of the charge air cooler. The contact surface of the protrusion can be an end surface of the protrusion. A seal can be arranged between the contact surface of the charge air cooler and the contact surface of the protrusion.

According to an embodiment of the invention, the air duct is provided with a flange, which is arranged against the outer surface of the air cooler housing. A seal is arranged between the flange and the outer surface of the air cooler housing. The air duct can be attached to the charge air cooler by means of bolts. In addition, the air duct can be attached directly to the air cooler housing.

BRIEF DESCRIPTION OF THE DRAWINGS

Embodiments of the invention are described below in more detail with reference to the accompanying drawings, in which.

DESCRIPTION OF EMBODIMENTS OF THE INVENTION

Figure 1:
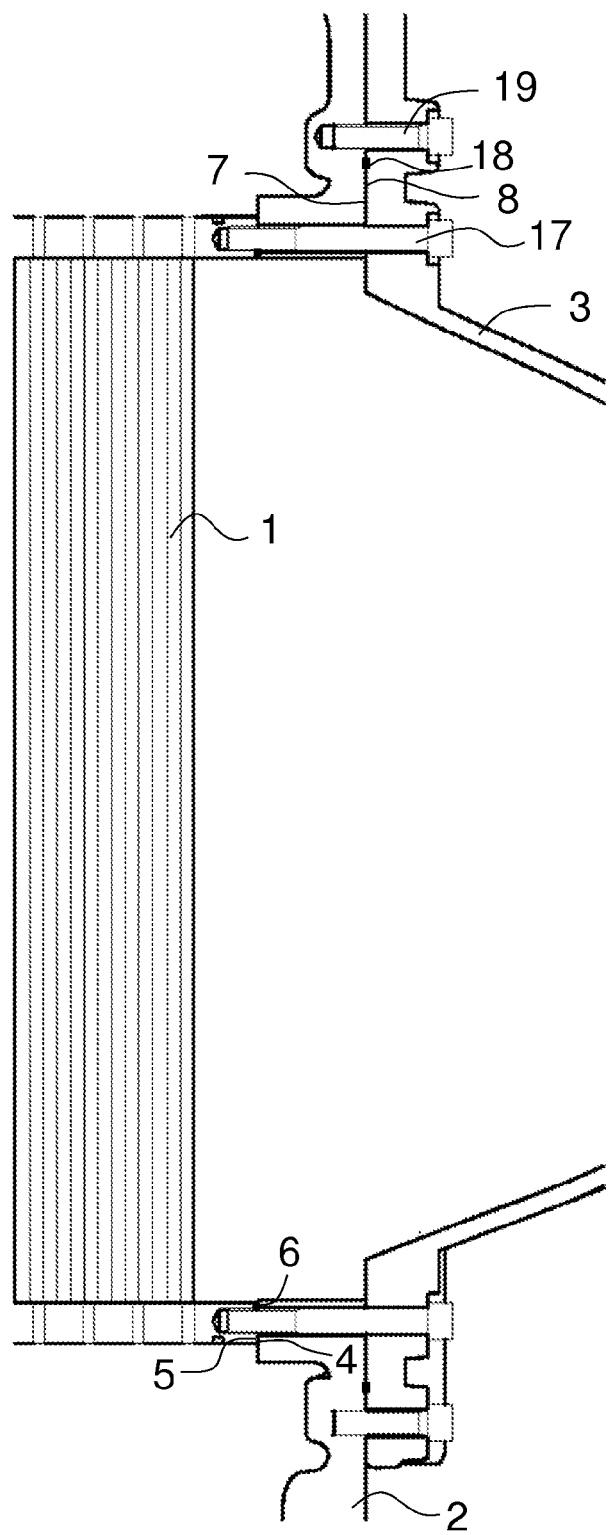
FIG. 1 shows a prior art charge air cooler arrangement.

In FIG. 1 is shown a prior art charge air cooler arrangement for a piston engine. The engine where the arrangement is used is a large internal combustion engine, such as a main or an auxiliary engine of a ship or an engine that is used at a power plant for producing electricity. The charge air cooler arrangement comprises a charge air cooler 1, which is arranged inside an air cooler housing 2. The intake air of the engine is conducted from a turbocharger of the engine into the air cooler housing 2 and into the charge air cooler 1 via an air duct 3. The charge air cooler 1 is provided with a contact surface 4, which is arranged against a first contact surface 5 of the air cooler housing 2. A seal 6 is arranged between the contact surfaces 4, 5 of the charge air cooler 1 and the air cooler housing 2. Bolts 17 are used for attaching the charge air cooler 1 to the air cooler housing 2. Also the air duct 3 is provided with a contact surface 7, which is arranged against a second contact surface 8 of the air cooler housing 2. A seal is arranged between the contact surfaces 7, 8 of the air duct 3 and the air cooler housing 2. The air duct 3 is attached to the air cooler housing 2 by means of bolts 19. The air cooler housing 2 is made by casting. However, for ensuring effective sealing between the charge air cooler 1 and the air cooler housing 2, and between the air cooler housing 2 and the air duct 3, the contact surfaces 5, 8 of the air cooler housing 2 need to be machined. The machining of the first contact surface 5, which is inside the air cooler housing 2 is complicated and time consuming. It is difficult to achieve sufficient surface quality and appropriate tolerances, and therefore the connection between the charge air cooler 1 and the air cooler housing 2 is prone to air leakages.

Figure 2:
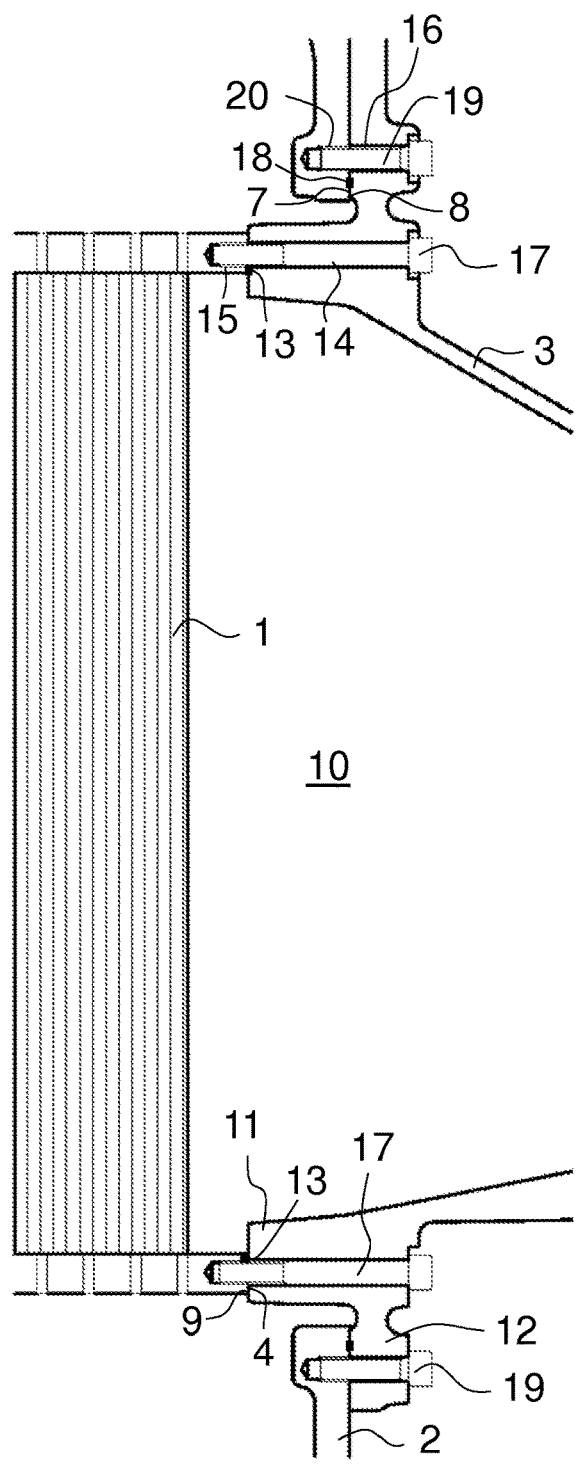
FIG. 2 shows a cross-sectional view of a charge air cooler arrangement according to an embodiment of the invention.
Figure 3:
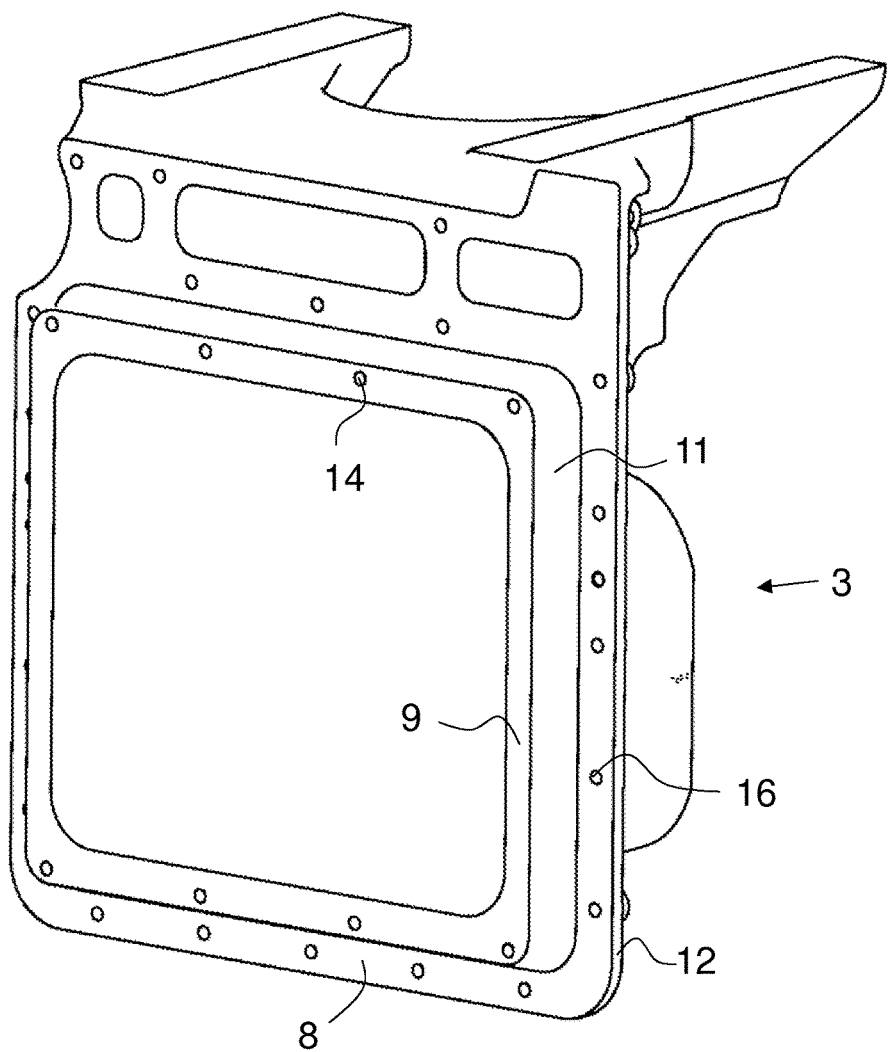
FIG. 3 shows an air duct for the charge air cooler arrangement of FIG. 2.

FIG. 2 shows a charge air cooler arrangement according to an embodiment of the invention. The charge air cooler arrangement is used in a large piston engine in the same way as the charge air cooler arrangement of FIG. 1. Like the prior art charge air cooler arrangement of FIG. 1, the charge air cooler arrangement of FIG. 2 comprises a charge air cooler 1, an air cooler housing 2 and an air duct 3. The air duct 3 is arranged to introduce charge air from a turbocharger into the air cooler housing 2 and the charge air cooler 1. The air duct 3 is shown in more detail in FIG. 3. The air cooler housing 2 forms a fluid-tight space, through which the charge air can flow. The intake air system of the engine can comprise only one charge air cooler 1 or two or more charge air coolers 1. In case the intake air system comprises two or more charge air coolers 1, one or more of the charge air coolers 1 may receive pressurized intake air from another charge air cooler 1 and not directly from a turbocharger. The engine may comprise two or more turbochargers that are arranged in series, and in that case one or more of the charge air coolers 1 may be arranged between the turbocharging stages and one or more of the charge air coolers 1 may be arranged downstream from all the turbochargers. Each air cooler housing 2 accommodates one charge air cooler 1. The charge air cooler arrangement of FIG. 2 can be any of the charge air cooler arrangements of the engine. The other charge air cooler arrangements can be similar to the arrangement shown in FIG. 2. The intake air of the engine flows through the charge air cooler 1 and heat from the intake air is absorbed to cooling water that flows in a cooling water circuit. The charge air cooler 1 is thus a gas-to-liquid heat exchanger, which transfers heat from air to water. The cooling liquid could also be some other liquid than water. If the engine comprises two charge air coolers 1, high temperature cooling water can be used in the first charge air cooler (high-temperature charge air cooler) in the flow direction of the intake air and low temperature cooling water can be used in the second charge air cooler (low-temperature charge air cooler).

The air cooler housing 2 and the air duct 3 are preferably casted parts. Only the critical surfaces of the air cooler housing 2 and the air duct 3, such as the surfaces, which are used for sealing, are machined. The charge air cooler 1 is arranged completely inside the air cooler housing 2. The charge air cooler 1 comprises a contact surface 4, which allows the charge air cooler 1 to be connected to an adjacent component in a fluid-tight manner. The charge air cooler 1 can be identical with the prior art charge air cooler 1 shown in FIG. 1. The air duct 3 is provided with a first contact surface 7 and a second contact surface 9, which allow the air duct 3 to be connected to adjacent components in a fluid-tight manner. Also the air cooler housing 2 is provided with a contact surface 8, which is arranged on the outer surface of the air cooler housing 2.

The air cooler housing 2 comprises a hole 10, through which the intake air is introduced into the air cooler housing 2 and into the charge air cooler 1. Also the charge air cooler 1 can be mounted inside the air cooler housing 2 via the hole 10. The air duct 3 is provided with a protrusion 11, which is arranged to protrude into the air cooler housing 2 through the hole 10. The outer diameter of the protrusion 11 is slightly smaller than the inner diameter of the hole 10. The protrusion 11 forms a channel for the intake air. The end surface of the protrusion 11 forms the second contact surface 9 of the air duct 3. The air duct 3 further comprises a flange 12, which can be supported against the air cooler housing 2. The flange 12 surrounds the protrusion 11 and has a larger outer diameter than the diameter of the hole 10 of the air cooler housing 2. The first contact surface 7 of the air duct 3 is arranged in the flange 12.

When the charge air cooler arrangement is assembled, the contact surface 4 of the charge air cooler 1 is against the second contact surface 9 of the air duct 3. A seal 13 is arranged between the charge air cooler 1 and the air duct 3. The charge air cooler 1 is thus airtightly connected directly to the air duct 3. The first contact surface 7 of the air duct 3 is against the contact surface 8 of the air cooler housing 2. A seal 18 is arranged between the air cooler housing 2 and the air duct 3. Since the charge air cooler 1 is sealed against the air duct 3 and not against an inner surface of the air cooler housing 2, the inner side of the air cooler housing 2 does not need to be machined. Compared to the prior art air duct 3 shown in FIG. 1, the air duct 3 needs to be provided with an additional contact surface, but the air duct 3 is easier to machine than the inner surface of the air cooler housing 2. Because of the simple construction of the charge air cooler arrangement, the manufacturing costs and the risk of air leakages are reduced.

The air duct 3 is provided with through-holes 14, which go through the protrusion 11. The charge air cooler 1 comprises holes 15, which open onto the contact surface 4 of the charge air cooler 1 and are provided with internal threads. The holes 14, 15 of the air duct 3 and the charge air cooler 1 allow the parts 1, 3 to be connected together by means of bolts 17. The air duct 3 is additionally attached directly to the air cooler housing 2 by means of bolts 19. The air duct 3 comprises holes 16 for fastening the air duct 3 to the air cooler housing 2. The holes 16 are arranged in the flange 12 of the air duct 3. The air cooler housing 2 is provided with blind holes 20 for the bolt joint between the air duct 3 and the air cooler housing 2. The charge air cooler 1, the air cooler housing 2 and the air duct 3 form a module, where the air duct 3 is fastened to the air cooler housing 2 and the charge air cooler 1 is fastened to the air duct 3.

It will be appreciated by a person skilled in the art that the invention is not limited to the embodiments described above, but may vary within the scope of the appended claims.

The invention claimed is:

1. A charge air cooler arrangement for a piston engine, the arrangement comprising:
    an air cooler housing;
    a charge air cooler, which is arranged inside the air cooler housing; and
    an air duct that is connected to the air cooler housing for introducing charge air into the charge air cooler, the air duct being configured to protrude into the air cooler housing and to be attached to the charge air cooler, wherein:
    the air duct is provided with a flange which is arranged against an outer surface of the air cooler housing;
    the air duct is provided with a protrusion which protrudes into the air cooler housing;
    the protrusion includes a contact surface which is an end surface of the protrusion and which is arranged against a contact surface of the charge air cooler; and
    a seal is arranged between the contact surface of the charge air cooler and the contact surface of the protrusion; and wherein the air duct is attached to the charge air cooler by bolts.

2. An arrangement according to claim 1, wherein a seal is arranged between the flange and the outer surface of the air cooler housing.

3. An arrangement according to claim 1, wherein the air duct is attached to the air cooler housing.

* * * * *